(12) United States Patent
Rubio Lamas et al.

(10) Patent No.: US 10,214,367 B2
(45) Date of Patent: Feb. 26, 2019

(54) ROTATING STACKER

(71) Applicants: Gruma SAB de CV, San Pedro Garza Garcia (MX); SHUTTLEWORTH LLC., Huntington, IN (US)

(72) Inventors: Felipe A. Rubio Lamas, Edinburg, TX (US); Miguel Angel Gonzalez Reyna, Guadalupe (MX); Greg Stroud, Huntington, IN (US); Rhett Eugene Craig, Ossian, IN (US)

(73) Assignee: GRUMA S.A.B. DE C.V., San Pedro Garza Garcia, N.L. (MX)

( * ) Notice: Subject to any disclaimer, the term of this patent is extended or adjusted under 35 U.S.C. 154(b) by 0 days.

(21) Appl. No.: 15/172,871

(22) Filed: Jun. 3, 2016

(65) Prior Publication Data
US 2017/0349387 A1 Dec. 7, 2017

(51) Int. Cl.
| | |
|---|---|
| *B65G 57/03* | (2006.01) |
| *B65G 47/244* | (2006.01) |
| *A21C 9/08* | (2006.01) |
| *B65G 57/11* | (2006.01) |

(52) U.S. Cl.
CPC ............ *B65G 57/035* (2013.01); *A21C 9/086* (2013.01); *B65G 47/244* (2013.01); *B65G 57/11* (2013.01); *B65G 2201/0202* (2013.01); *B65G 2814/0307* (2013.01)

(58) Field of Classification Search
CPC .... B65G 57/035; B65G 47/244; B65G 57/11; B65G 2201/0202; B65G 2814/0307; A21C 9/086
USPC ..................................................... 414/791.2
See application file for complete search history.

(56) References Cited

U.S. PATENT DOCUMENTS

| | | | | |
|---|---|---|---|---|
| 3,940,794 A | * | 2/1976 | Griffiths | ............... G11B 5/5521 360/98.03 |
| 4,530,632 A | | 7/1985 | Sela | |
| 4,720,229 A | * | 1/1988 | Steinhart | ............ B65H 31/3018 198/468.11 |
| 4,978,548 A | | 12/1990 | Cope et al. | |

(Continued)

FOREIGN PATENT DOCUMENTS

| | | |
|---|---|---|
| AR | 004931 | 4/1999 |
| CA | 2 088 441 | 8/1993 |

(Continued)

OTHER PUBLICATIONS

Extended European Search Report—EP 17 17 4128—dated Jan. 2, 2018.

*Primary Examiner* — Rakesh Kumar
(74) *Attorney, Agent, or Firm* — Haynes and Boone, LLP

(57) ABSTRACT

Some manufacturing processes include forming stacks of manufactured objects for handling and/or processing. While some such manufactured objects are consistent in thickness, other are more irregular. Some manufactured objects are generally flat, but are also generally thicker along one edge. When objects having these characteristics are stacked, the cumulative effect of such inconsistent thickness results in an unbalanced stack. The disclosed apparatus and method utilize a novel rotating stacker that rotates the stack of manufactured objects as each new object is added to the stack, thereby distributing the thickness inconsistency of individual objects throughout the stack, producing a more uniform stack without manual intervention.

12 Claims, 13 Drawing Sheets

(56) References Cited

U.S. PATENT DOCUMENTS

| | | | |
|---|---|---|---|
| 5,346,206 A * | 9/1994 | Steinhart | B65H 29/60 271/305 |
| 5,763,861 A | 6/1998 | Herrera et al. | |
| 5,842,557 A | 12/1998 | Montemayro et al. | |
| 5,993,146 A * | 11/1999 | Hallgren | B65G 1/07 187/269 |
| 6,053,695 A * | 4/2000 | Longoria | A21C 9/086 414/788.9 |
| 6,105,240 A * | 8/2000 | Chuang | G11B 19/20 29/603.03 |
| 6,168,370 B1 | 1/2001 | Longoria et al. | |
| 6,318,225 B1 | 11/2001 | Longoria | |
| 6,332,749 B1 | 12/2001 | Garcia-Balleza et al. | |
| 6,425,260 B1 | 7/2002 | Longoria | |
| 6,454,518 B1 | 9/2002 | Garcia-Balleza et al. | |
| 6,520,734 B2 | 2/2003 | Longoria et al. | |
| 6,634,483 B1 | 10/2003 | Longoria | |
| 6,845,860 B1 | 1/2005 | Walker | |
| 9,271,505 B2 | 3/2016 | Christopher et al. | |
| 2001/0043859 A1 | 11/2001 | Longoria et al. | |
| 2002/0001654 A1 | 1/2002 | Sanchez de la Camara | |
| 2002/0018837 A1 | 2/2002 | Lanner et al. | |
| 2002/0018838 A1 | 2/2002 | Zimmerman et al. | |
| 2002/0022076 A1 | 2/2002 | Lanner et al. | |
| 2002/0031425 A1 | 3/2002 | Garcia-Balleza et al. | |
| 2002/0034571 A1 | 3/2002 | Zimmerman et al. | |
| 2002/0034573 A1 | 3/2002 | McNeel et al. | |
| 2002/0041803 A1 | 4/2002 | Bierschneck et al. | |
| 2002/0044996 A1 | 4/2002 | McNeel et al. | |
| 2002/0098074 A1 * | 7/2002 | Gammerler | B65H 29/38 414/788.3 |
| 2002/0152898 A1 | 10/2002 | Dubois et al. | |
| 2003/0232103 A1 | 12/2003 | Marino et al. | |
| 2004/0005387 A1 | 1/2004 | Janecka | |
| 2004/0038386 A1 | 2/2004 | Zesch et al. | |
| 2004/0084348 A1 | 5/2004 | Nash, Jr. et al. | |
| 2004/0105925 A1 | 6/2004 | Rubio et al. | |
| 2004/0112228 A1 | 6/2004 | Nash, Jr. et al. | |
| 2004/0159572 A1 | 8/2004 | Nash, Jr. et al. | |
| 2004/0175469 A1 | 9/2004 | Janecka | |
| 2004/0226932 A1 | 11/2004 | Flinn | |
| 2005/0092581 A1 | 5/2005 | Walker | |
| 2005/0224502 A1 | 10/2005 | Lambert et al. | |
| 2005/0279668 A1 | 12/2005 | Nash, Jr. et al. | |
| 2006/0024407 A1 | 2/2006 | Rubio et al. | |
| 2006/0054463 A1 | 3/2006 | Walker | |
| 2006/0175745 A1 * | 8/2006 | Gunther | B65H 31/10 270/52.07 |
| 2006/0196803 A1 | 9/2006 | Nash, Jr. et al. | |
| 2006/0219069 A1 | 10/2006 | Skaar et al. | |
| 2006/0266814 A1 | 11/2006 | Zerarka et al. | |
| 2007/0110866 A1 | 5/2007 | Rubel | |
| 2007/0171766 A1 | 7/2007 | Loiselet | |
| 2008/0160150 A1 | 7/2008 | Hupfer et al. | |
| 2008/0220132 A1 | 9/2008 | Taminich | |
| 2008/0230532 A1 | 9/2008 | Kozman et al. | |
| 2008/0282903 A1 | 11/2008 | Gonzalez | |
| 2009/0092475 A1 | 4/2009 | Foulon, Jr. et al. | |
| 2009/0104333 A1 | 4/2009 | Lykomitros et al. | |
| 2009/0142465 A1 | 6/2009 | Sturkenboom et al. | |
| 2009/0208892 A1 | 8/2009 | Kozman et al. | |
| 2011/0067579 A1 | 3/2011 | Ganuza | |
| 2011/0081225 A1 | 4/2011 | Ward et al. | |
| 2011/0271848 A1 | 11/2011 | Kuo | |
| 2011/0280994 A1 | 11/2011 | Redd et al. | |
| 2011/0311699 A1 | 12/2011 | Ewald et al. | |
| 2012/0097668 A1 | 4/2012 | McGuinness et al. | |
| 2012/0138603 A1 | 6/2012 | McGuinness et al. | |
| 2012/0192721 A1 | 8/2012 | Gonzalez | |
| 2012/0193257 A1 | 8/2012 | Gonzalez | |
| 2012/0193345 A1 | 8/2012 | Gonzalez | |
| 2012/0196010 A1 | 8/2012 | Fuentes et al. | |
| 2013/0224363 A1 | 8/2013 | Kent | |
| 2013/0239824 A1 | 9/2013 | Gonzalez | |
| 2013/0243916 A1 | 9/2013 | Bright et al. | |
| 2013/0251495 A1 * | 9/2013 | Hohenthanner | B65H 3/0816 414/791.2 |
| 2014/0026763 A1 | 1/2014 | Borbolla Gonzalez | |
| 2014/0262682 A1 | 9/2014 | Christopher et al. | |
| 2015/0034633 A1 | 2/2015 | Kinney | |
| 2015/0064301 A1 | 3/2015 | McCarney | |
| 2015/0128809 A1 | 5/2015 | Hansmann et al. | |
| 2015/0135921 A1 | 5/2015 | Martinez-Montes | |
| 2015/0245420 A1 | 8/2015 | Peterson | |

FOREIGN PATENT DOCUMENTS

| | | | |
|---|---|---|---|
| CA | 2 158 625 | 3/1996 | |
| GB | 2051722 * | 6/1980 | B65G 57/035 |
| GB | 2 051 722 | 1/1981 | |
| GB | 2051722 A * | 1/1981 | B65G 57/035 |

* cited by examiner

ROTATING STACKER

BACKGROUND OF THE INVENTION

Field of the Invention

The invention is directed to an apparatus and method for creating a stack of manufactured objects, particularly flatbreads.

Description of the Related Art

Methods and apparatuses for creating and managing stacks of manufactured products are well known. One such manufactured product is flatbread. 'Flatbread' is considered to encompass: thick and thin tortillas, made either of corn, wheat, or any other type of flour; piadinas; naan; paratha; roti; chapatti; lavash; focaccia; wraps; pita; and pizza crust.

Flatbread is generally a baked dough product. Even if dough begins as perfectly disc-shaped prior to baking, the inherent heterogeneous nature of dough results in inconsistencies in perimeter and thickness of the final product. Moreover, it has been discovered by the present inventors that a common method for flatbread production leads to an inherent inconsistency in the final product. When produced on an industrial scale, it is common to use a die-cut process to form the dough discs that are baked into flatbreads. Dough is passed through a matched set of rollers or a roller and a platen that produce an extrusion of dough. Dies in the roller cut discs from the dough extrusion. The discs are baked into flatbread, while the remainder is discarded or passed back into the process for re-extrusion.

The present inventors have discovered that as the dough extrusion passes through the dies, the dough is pressed against a forward edge of each die. As a consequence, while the final flatbread product has irregularities due the baking process, a forward edge of each flatbread product is, on average, thicker than a remaining portion. As a consequence, when a stack of flatbreads is created without any change in the orientation of the flatbreads, the slightly thicker portions of the flatbreads are generally aligned within the stack. This has a cumulative effect in the stack, leading to a stack that is curved instead of being vertical. If this curve is not corrected prior to packaging in a bag, the packaged stack will also be curved. This causes problems as bags of stacked flatbreads are themselves stacked, leading to difficulties in transportation and display for sale. Such curved stacks are also considered less appealing to consumers, who desire consistency in many manufactured food products.

In the absence of a rotating stacker as disclosed, it has been necessary to have personnel manually 'shuffle' each stack of flatbreads to produce a stack that is generally straight prior to packaging. This increases cost, relies on the attention to detail of personnel, and increases human contact with the flatbread. These are all disadvantages that can be remedied by the present rotating stacker.

In addition to flatbread products that are known to produce a thicker forward edge, it has been discovered that even in connection with flatbread products that do not generally have a thicker forward edge due to the manufacturing process, the stack of products can be improved by rotating the stack during stack formation. One reason is the fact that certain manufactured products do not fall cleanly onto a stack support as they are transferred thereto. Rotating the stack during stack formation helps some such products settle into place, forming a more uniform stack. Even if the rotation does not cause the product to fully settle into position, it is possible that the manufactured products end up with a foremost edge of the product leaning against the machinery that helps form the stack. As the stack is rotated during stack formation, these edges will be evenly distributed around the circumference of the stack, thereby avoiding the cumulative effect of keeping these edges aligned.

SUMMARY OF THE INVENTION

To address the problems inherent in creating stacks of manufactured products, in particular flatbreads, a method and apparatus that utilizes a rotating stacker is provided. In such method and apparatus, manufactured objects are conveyed to a stack support to create a stack of such objects. As each successive object is added to the stack, the stack support rotates. In this way, the rotational orientation of the various objects in the stack is distributed throughout a range, thereby avoiding a cumulative effect of inconsistencies in the thickness of the objects as the stack is created.

In a first embodiment, a rotating stacker includes: a stack support; an input conveyor arranged so that objects transported by the input conveyor can be moved toward and be supported by the stack support, thereby forming an object stack; an output conveyor arranged so that the object stack can be moved off of the stack support. The stack support is constructed and arranged to assume a plurality of different rotational positions with respect to the input conveyor as the input conveyor transports the objects to the stack support while a single object stack is formed.

In various other embodiments, the stack support is constructed and arranged so as not to rotate while each object is being added to the object stack. The stack support can be made to rotate through a fixed predetermined rotation angle during a time between successive objects being added to the object stack. The stacker can be made to be adjustable by a user to set the rotation angle to a desired value.

Alternatively, the rotating stacker of claim can be made to rotate continuously while the object stack is being formed, and can be adjustable by a user to set a rate at which the stack support continuously rotates while the object stack is being formed.

In other embodiments, the stack support moves vertically with respect to the input conveyor as the object stack is formed, and such vertical movement can be downward. In one variation, the stack support moves downward with respect to the input conveyor as the object stack is formed so as to maintain a generally consistent position of a top of the object stack with respect to the input conveyor.

In a method for creating a stack of object, steps can include: a) moving the objects toward a stack support so that each of the objects comes to rest on the stacker or another object supported by the stacker; b) repeating step a) until a full stack of the objects on the stack support is formed; and c) moving the full stack off of the stack support; wherein the stack support is rotated as the step a) is repeated so that at least one of the objects is effectively rotated with respect to another of the objects on the stack.

In one variation of such method, step a) is performed so that the stack support does not rotate while each object is being added to the object stack. The stack support can be made to rotate through a fixed predetermined rotation angle during a time between successive objects being added to the object stack. The stack support can rotate continuously while the object stack is being formed.

In another variation, step a) is performed so that the stack support moves vertically with respect to the input conveyor as the object stack is formed, and such vertical movement can be downward. More specifically, step a) can be performed so that the stack support moves downward with respect to the input conveyor as the object stack is formed so as to maintain a generally consistent position of a top of the object stack with respect to the input conveyor.

In embodiments directed specifically to a rotating stacker for flatbread, the device can include: a stack support; an input conveyor arranged so that flatbreads transported by the input conveyor can be moved toward and be supported by the stack support, thereby forming a flatbread stack; and an output conveyor arranged lower than the input conveyor so that the flatbread stack can be moved off of the stack support. The stack support can include a platform on a top end of a rod, the rod being controlled to perform vertical motion between upper and lower positions, the upper position placing the stack support relatively nearer the input conveyor, the lower position placing the stack support relatively nearer the output conveyor.

The rod can also be controlled to perform rotational motion so as to rotate the stack support and any of the flatbreads in the flatbread stack resting on the stack support. The rotating flatbread stacker can repeatedly raise the rod to the upper position to create a new flatbread stack, and for each flatbread that is added to the stack by the input conveyor, perform the vertical motion to lower the stack so as to keep a top of the flatbread stack in generally a constant position with respect to the input conveyor, and perform the rotational motion, until the flatbread stack is complete. At that point, the rod can be moved to the lower position so the output conveyor can move the flatbread stack away from the stack support.

'Flatbread' is considered to include, but not necessarily be limited to: thick and thin tortillas, made either of corn, wheat, or any other type of flour; piadinas; naan; paratha; roti; chapatti; lavash; focaccia; wraps; pita; and pizza crust.

In one embodiment of the flatbread stacker, the stack support does not rotate while each flatbread is being added to the flatbread stack. The stack support can be made to rotate through a fixed predetermined rotation angle during a time between successive flatbreads being added to the flatbread stack, and can be adjustable by a user to set the rotation angle to a desired value.

Alternatively, the stack support can rotate continuously while the flatbread stack is being formed, and can be adjustable by a user to set a rate at which the stack support continuously rotates while the object stack is being formed.

DESCRIPTION OF THE DRAWINGS

The apparatus and method will be described in connection with the attached drawings in which.

DETAILED DESCRIPTION OF THE PREFERRED EMBODIMENTS

Figure 1:
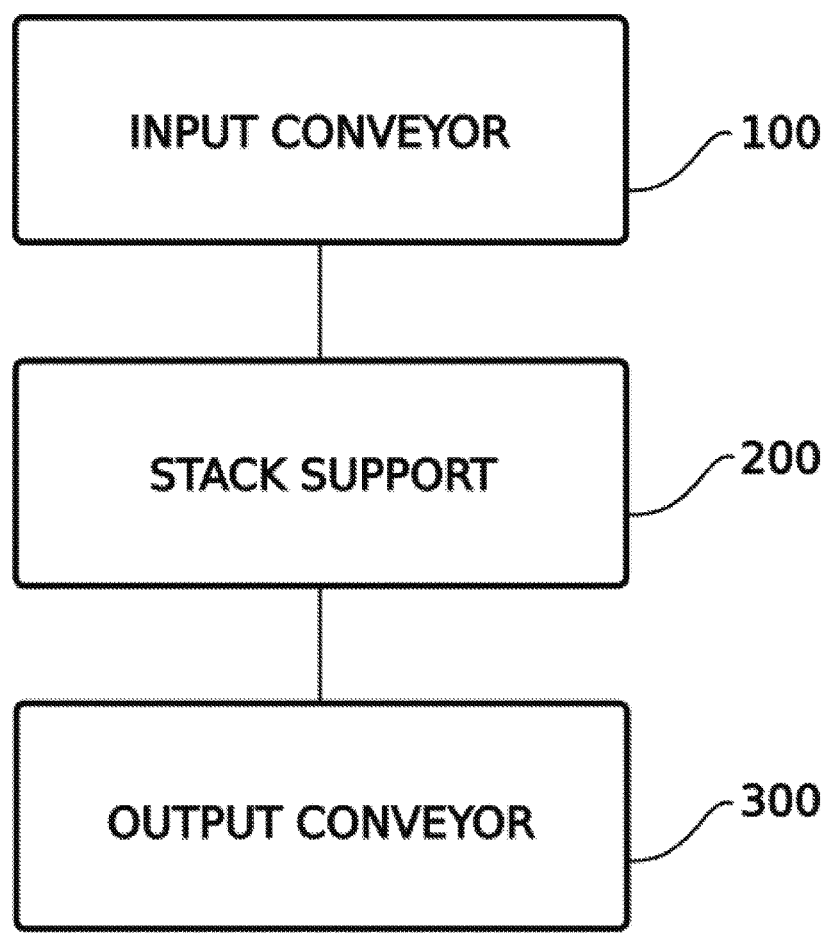
FIG. 1 is a generalized block diagram of the apparatus.

As generically illustrated in FIG. 1, a representative embodiment of a rotating stacker includes three elements: an input conveyor 100, a stack support 200, and an output conveyor 300. The three elements can be configured to transport objects via the input conveyor 100 to the stack support 200. The objects are then formed into a stack on the stack support 200 in such a way that the stack support 200 rotates during formation of the stack. When a full stack of the objects has been created on the stack support 200, the full stack is transported away from the stack support 200 via the output conveyor 300 for further handling.

Figure 2:
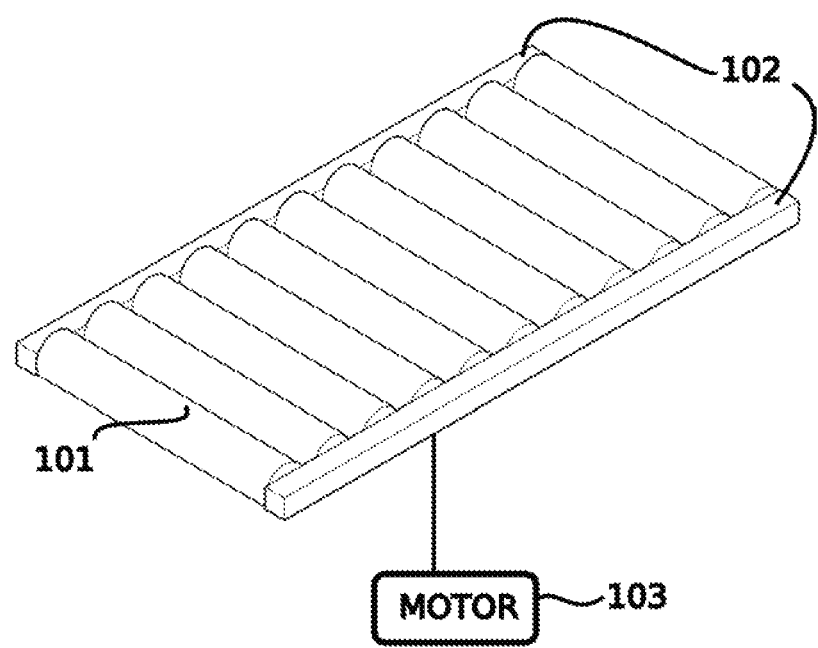
FIG. 2 illustrates an exemplary input conveyor.

The input conveyor can take any of a number of forms known in the field of material handling and transport. These can include, but are not limited to, slip-torque conveyors, belt conveyors, gravity rollers, powered rollers, circular conveyors, spiral chutes, air cushion, or any other conveyance mechanism appropriate for the object being stacked. For purposes of illustration, FIG. 2 illustrates a set of rollers 101, each held rotatably in place by roller supports 102. Rollers 101 can be free to rotate, thereby allowing objects being conveyed by such rollers to move by force of gravity, or the rollers can be driver by a motor 103, as shown schematically in FIG. 2.

Figure 3A:
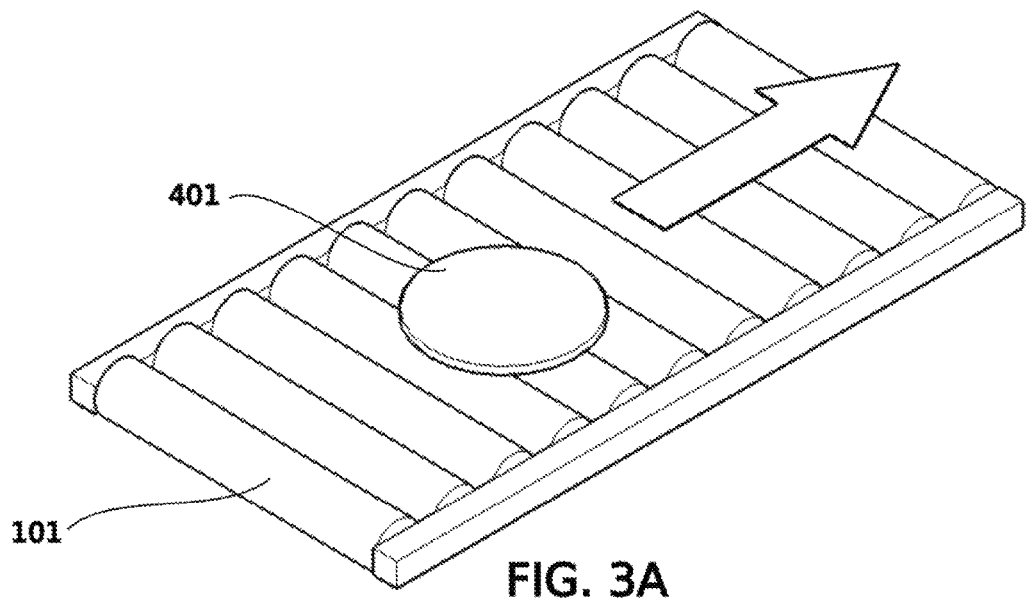
FIGS. 3A and 3B illustrate two examples of an input conveyor.

FIG. 3A illustrates the input conveyor of FIG. 2, in addition to an object 401 being transported thereby. Object 401 rests on rollers 101. Object 401 moves in the direction of the arrow in conjunction with rotation of rollers 101.

Figure 3B:
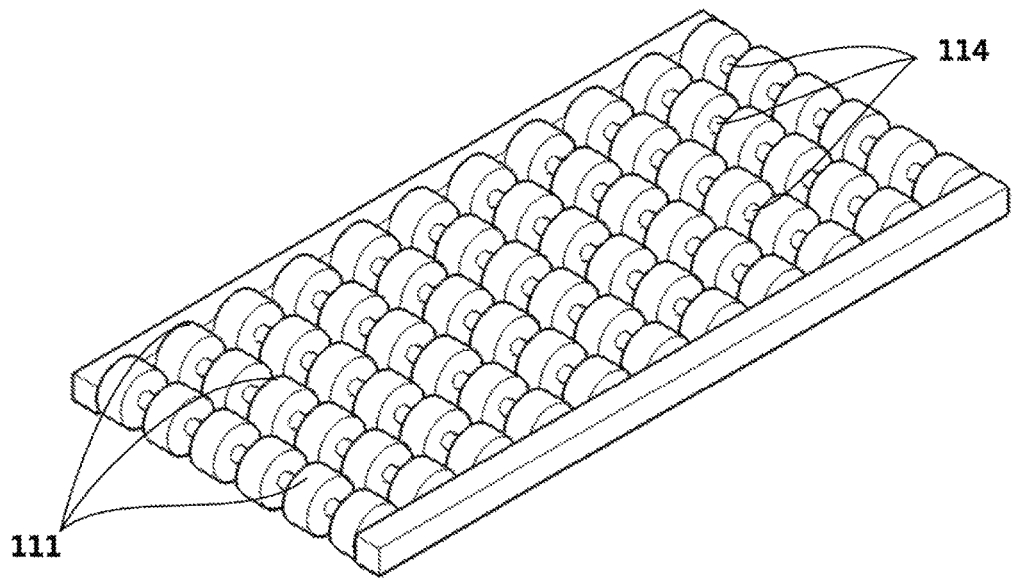

An alternative to the device of FIG. 2 and FIG. 3A is the roller arrangement of FIG. 3B. In this embodiment, each of the rollers 101 is replace by multiple partial rollers 111. A set of partial rollers 111 share a shaft 114. Each set of partial rollers 111 may be fixed to its respective shaft 114, freely rotatable independently about its respective shaft 114, or connected by a slip-torque arrangement to its respective shaft 114. In a slip-torque arrangement, each shaft 114 is driven by a motor 103, illustrated schematically. Each shaft 114 imparts such rotational motion to the partial rollers 111 attached to such shaft 114. The interconnection between each partial roller 111 and its shaft 114 is such that in the event of a given amount of resistance to such rotational motion experienced by a given partial roller 111, the partial roller 111 will rotate at a lower rate than its shaft 114, or will not rotate at all.

This may be useful in the connection with one or both of the input conveyor 100 and the output conveyor 300, in installations in which the objects being conveyed and stacked may be stopped at various points while being transported by the input or output conveyors 100 or 300. A slip-torque roller arrangement allows the continuous driving of the roller system without producing abrasion of the objects being transported while they are held in place.

From the perspective of workflow and object travel, stack support 200 is between input and output conveyors 100 and 300. Stack support 200 provides the mechanism to allow formation of a stack of objects delivered by input conveyor 100. Such mechanism can include adjustment of a height of stack support 200, which in turns adjusts the height of the stack of objects being formed on stack support 200. Such mechanism can also include rotation of the stack during stack formation.

Figure 4A:
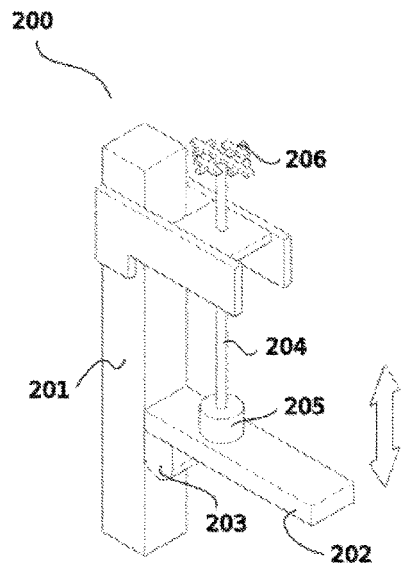
FIGS. 4A-4D illustrate various positions of a support plate.
Figure 4B:
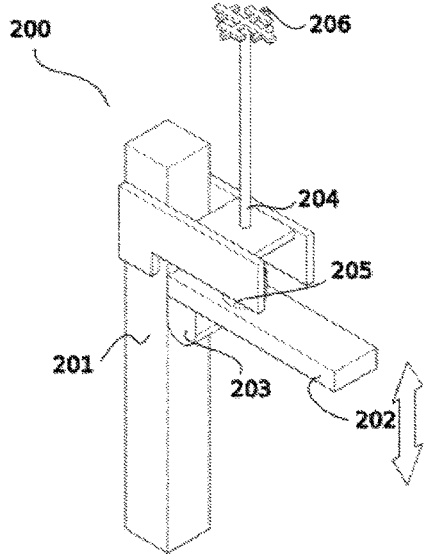

FIG. 4A through FIG. 4D illustrate stack support 200, including base 201 onto which is mounted platform 202. Platform 202 can move linearly along a face of base 201. FIG. 4A and FIG. 4B illustrate stack support 200 with platform 202 in lower and upper positions. Such motion is provided through platform motor 203.

Figure 4C:
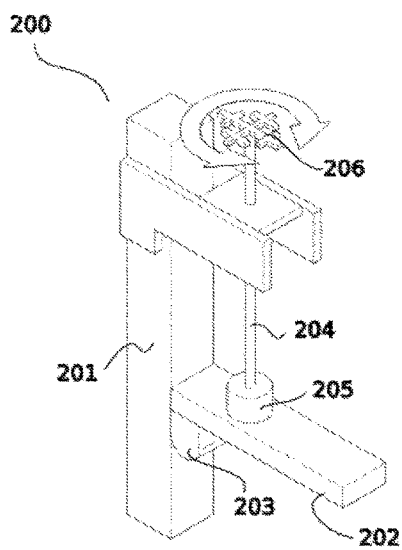
Figure 4D:
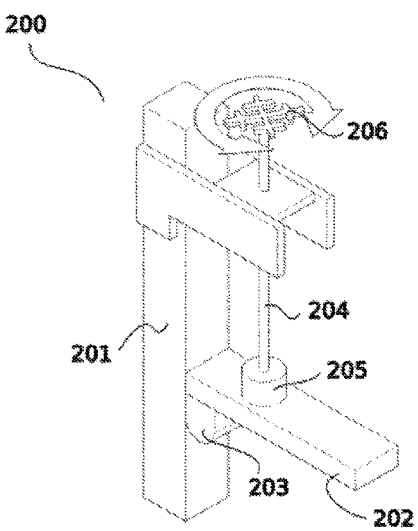

Support shaft 204 is rotationally mounted at a first end to platform 202. Support shaft motor 205 provides the rotation of support shaft 204 with respect to platform 202. Support plate 206 is fixed to a second end of support shaft 204. FIG. 4C and FIG. 4D illustrate support shaft 204 and support plate 206 rotated into two different positions.

Figure 5:
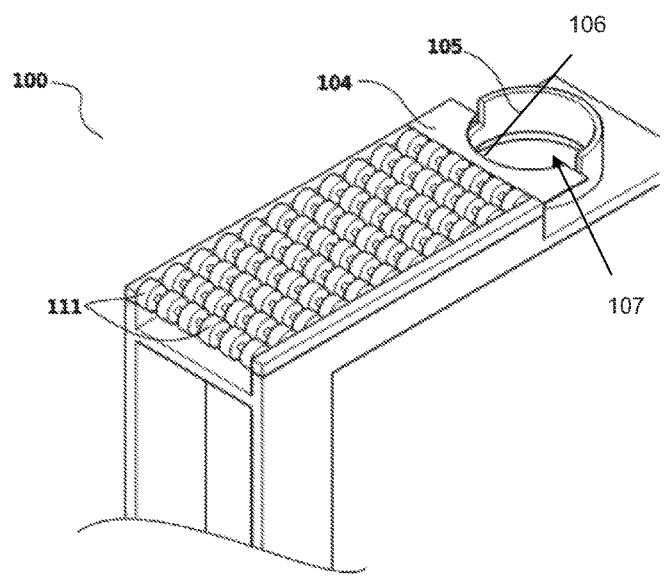
FIG. 5 illustrates details of an input conveyor.

Input conveyor 100 can further include slide plate 104 including a semi-circle cut-out 106 defined therein and backstop 105, as illustrated in FIG. 5. As objects being stacked transition from input conveyor 100 to stack support 200, momentum of the objects moving across partial rollers 111 carries the objects across slide plate 104. Further movement of the objects is stopped by backstop 105. Once each object makes contact with backstop 105, it drops onto stack support 200 through drop channel 107, which is aligned with the semi-circle cut-out 106.

Figure 6:
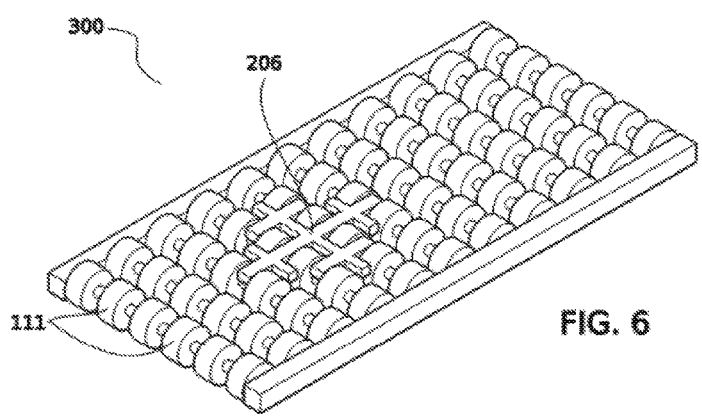
FIG. 6 illustrates a support plate recessed into an output conveyor.

Support plate 206 can be shaped in such a way as to allow a transfer of one or more objects supported by support plate 206 to output conveyor 300. As illustrated in FIG. 6, support plate 206 can be shaped so that it provides the necessary support for the objects being stacked, while also being able to recess into output conveyor 300. In an arrangement using partial rollers 111, support plate 206 can be shaped so that its upper surface drops below a highest point of each partial roller 111. As support plate 206 descends into this position, any object or stack of objects supported thereby will transition to support by the partial rollers 111. This allows the object or stack of objects to be transported off by the output conveyor 300.

Alternative shapes for support plate 206 can be readily produced to accommodate various configurations of output conveyor 300.

Figure 7:
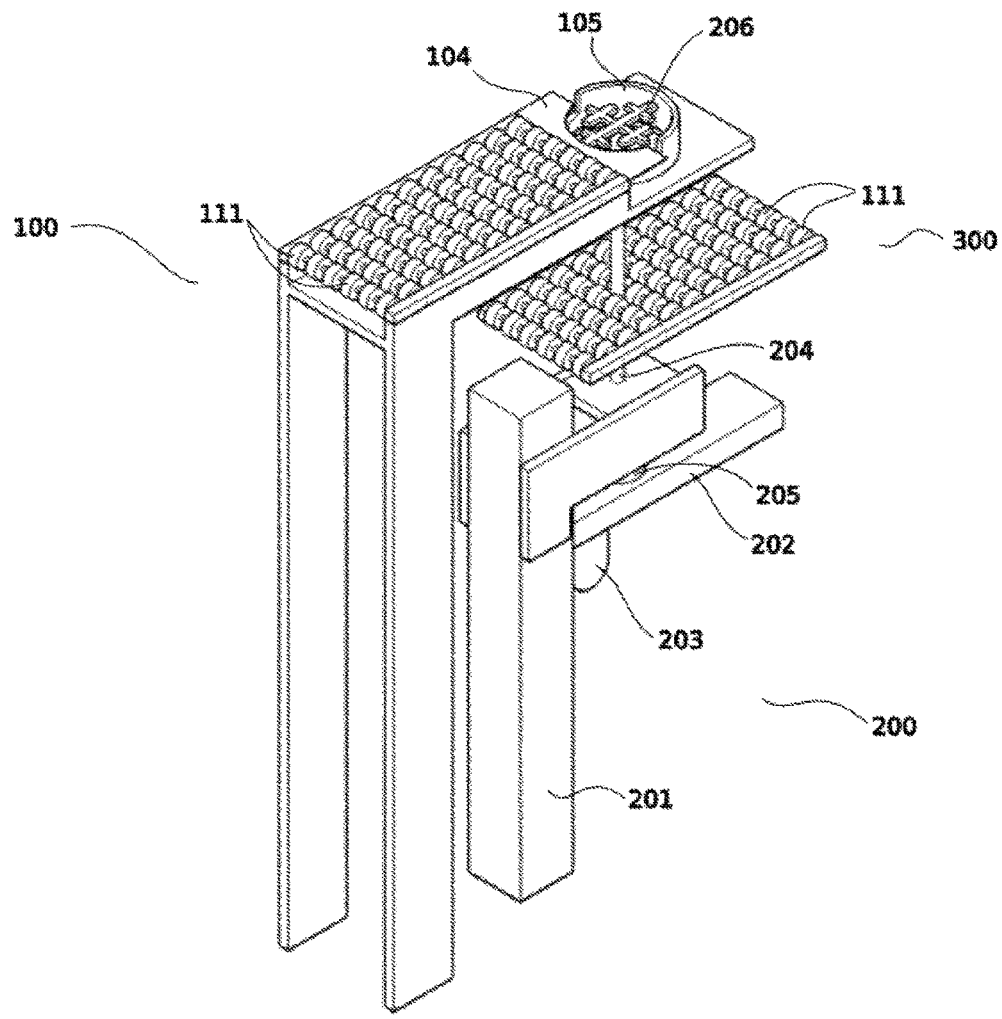
FIG. 7 illustrates a support plate in an upper position.
Figure 8:
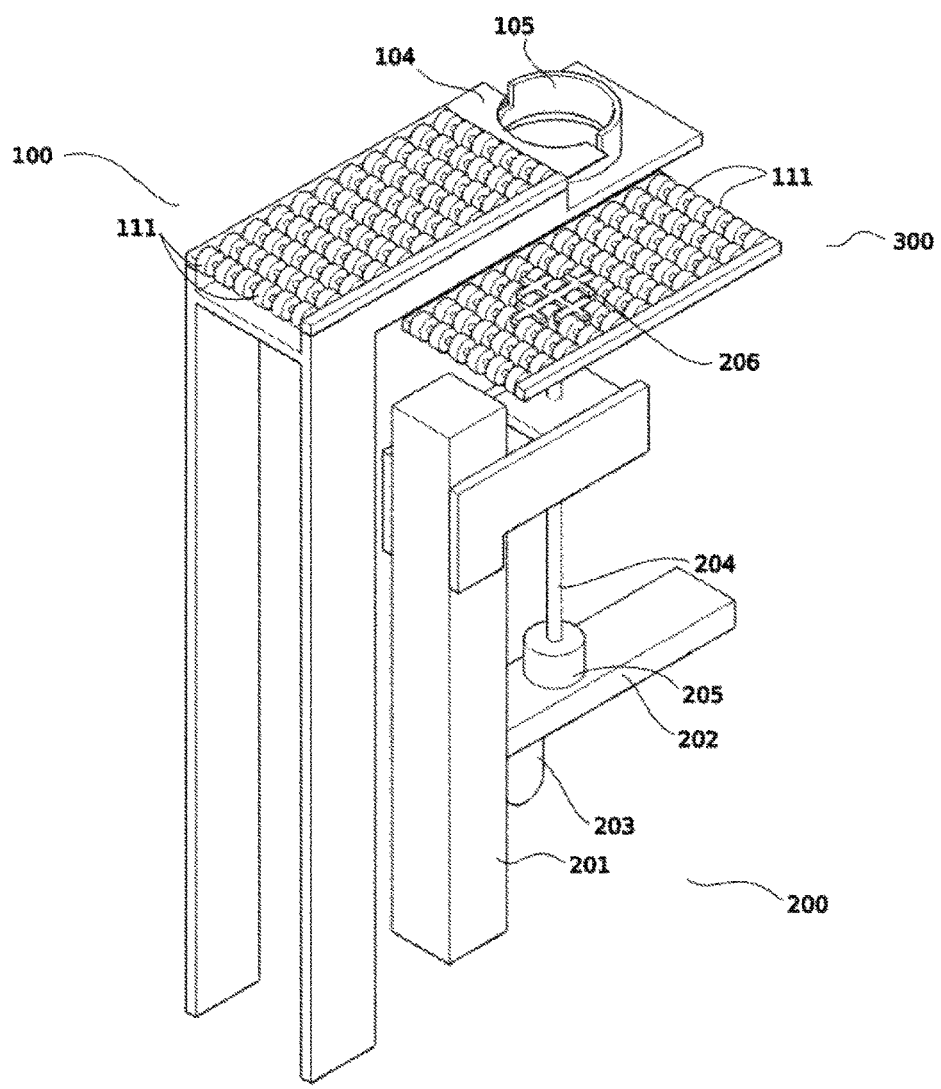
FIG. 8 illustrates a support plate in a lower position.

FIG. 7 and FIG. 8 illustrate an arrangement of input conveyor 100, stack support 200, and output conveyor 300 in two different positions. FIG. 7 illustrates the components in position ready to create a new stack. FIG. 8 illustrates the components as they may appear when a complete stack has been created, and the stack is ready to be transported away by output conveyor 300. In FIG. 7, platform 202, support shaft 204, and support plate 206 are in their upper positions, and support plate 206 is positioned near a level of the partial rollers 111 of input conveyor 100 and slide plate 104. In FIG. 8, these components are in their lower positions, and support plate 206 is recessed into partial rollers 111 of output conveyor 300. With an upper face of support plate 206 below the upper points of partial rollers 111, and object or stack of objects would be supported by partial rollers 111. Lowering of support plate 206 to this position thereby effects a transfer of an object or stack of objects from support plate 206 to partial rollers 111 of output conveyor 300.

Figure 9A:
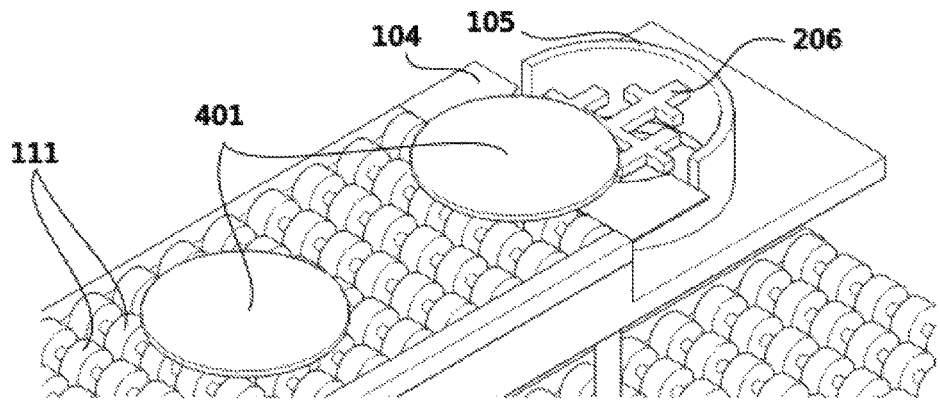
FIGS. 9A-9F illustrate formation of a stack of objects.

FIG. 9A through FIG. 9F illustrate the stacker as described thus far. In FIG. 9A, the apparatus is in position to create a new stack of objects 401. Two objects 401 are being transported by input conveyor 100 as they travel across partial rollers 111. The first of the two objects 401 has transitioned from partial rollers 111 to slide plate 104. Its momentum from being carried along by partial rollers 111 causes object 401 to slide across slide plate 104.

Figure 9B:
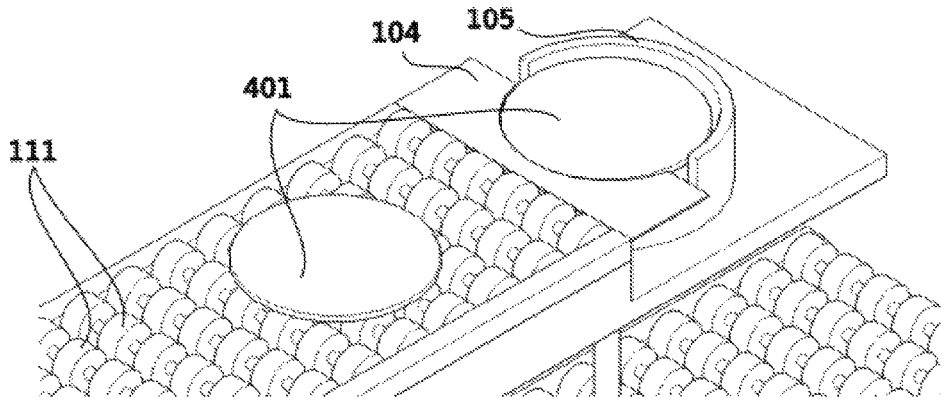

In FIG. 9B, the first of the two objects 401 has moved across slide plate 104 and continued onto support plate 206. The forward movement of object 401 was stopped by its contact with backstop 105, causing object 401 to come to rest on support plate 206. The second object 401 continues to travel along partial rollers 111 of input conveyor 100. In conjunction with the object 401 coming to rest on support plate 206, the linearly movable portion of stack support 200 moves downward. This downward movement is on the order of the thickness of a single object 401. In this way, as a stack of objects 401 is formed the top of such stack is approximately at the height of an upper surface of support plate 206 when the first object 401 is dropped onto the support plate 206 at the beginning of the formation of a stack.

Figure 9C:
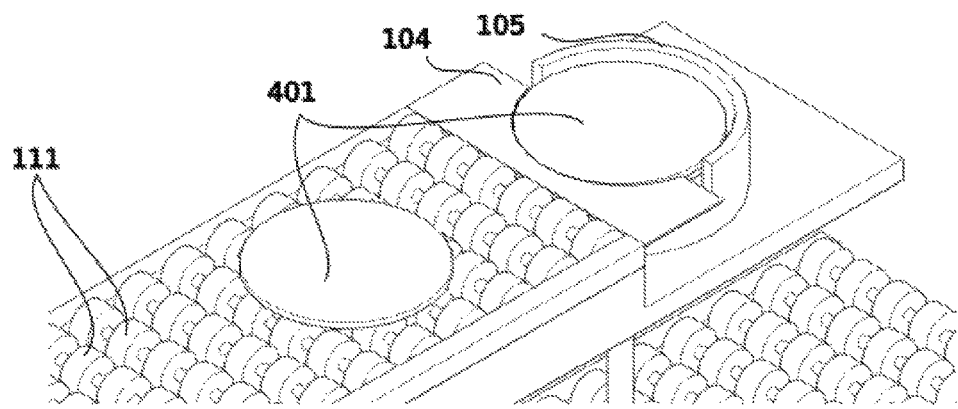

In FIG. 9C, the first two objects 401 have been transferred onto support plate 206, starting a stack of objects 401. The linearly movable portion of stack support 200 has descended to maintain a top of the stack of objects 401 at a generally constant height relative to input conveyor 100.

Figure 9D:
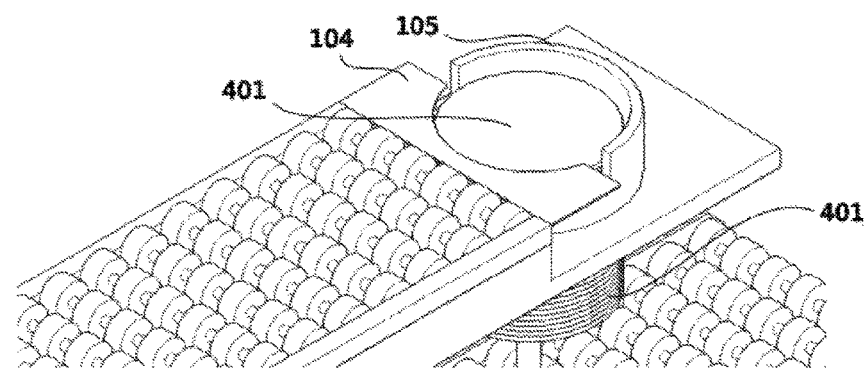
Figure 9E:
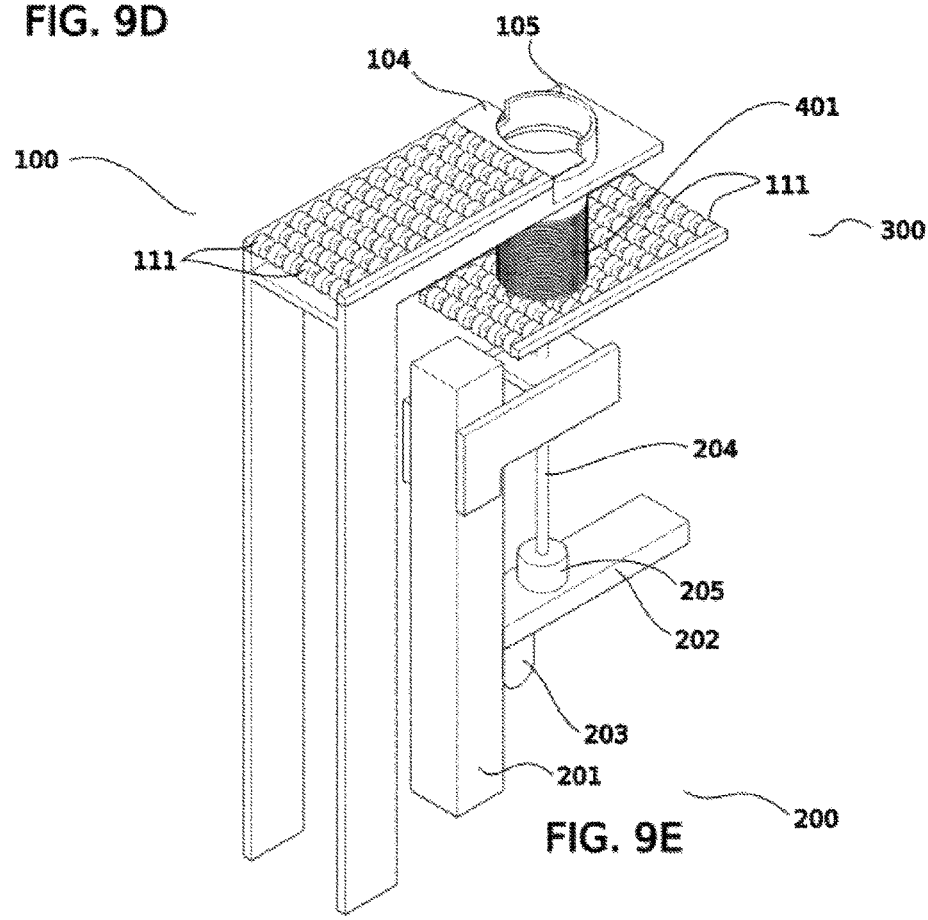
Figure 9F:
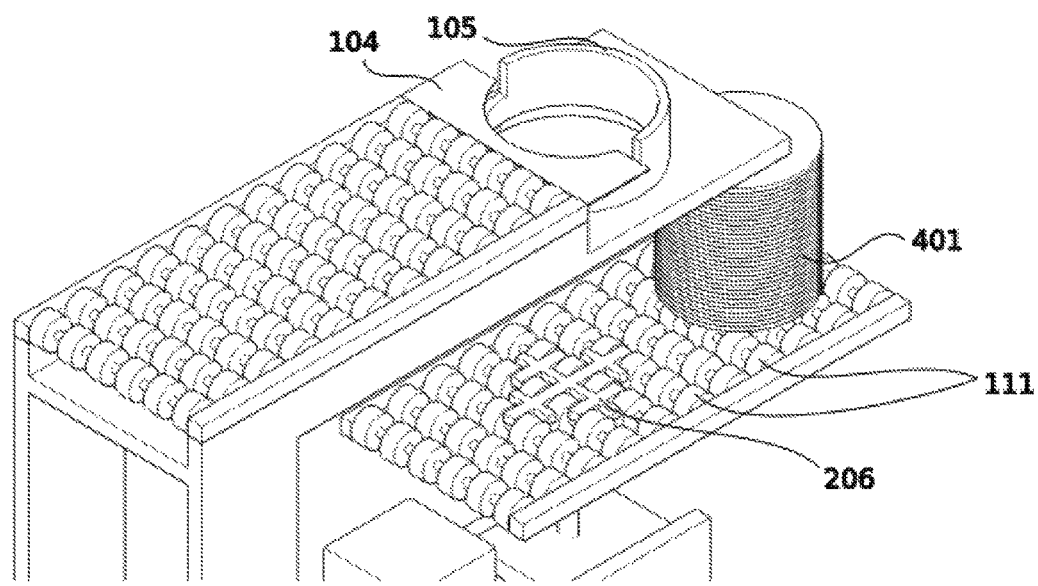

In FIG. 9D, a full stack of objects 401 has been formed. Through an appropriate control mechanism, any further objects 401 are halted from proceeding along input conveyor 100. The linearly movable portion of stack support 200 then lowers to the position first illustrated in FIG. 8. FIG. 9E shows the apparatus and stack in this position. With support plate 206 in its lowest position, recessed into partial rollers 111 of output conveyor 300, objects 401 are now supported by partial rollers 111, and are no longer resting on support plate 206. This allows the stack of objects 401 to be transported by output conveyor 300 for further processing. FIG. 9F illustrates the stack of objects 401 being transported by output conveyor 300 away from support plate 206.

Objects 401 illustrated herein are shown to have planar faces and without inconsistency. For objects formed this precisely, there may be no requirement to rotate support plate 206 during formation of the stack of objects 401. However, there are other objects of manufacture that, while generally flat, are slightly irregular in shape. One such manufactured object is the food item called flatbread. For present purposes, the term 'flatbread' is considered to encompass: thick and thin tortillas, made either of corn, wheat, or any other type of flour; piadinas; naan; paratha; roti; chapatti; lavash; focaccia; wraps; pita; and pizza crust. The remaining description addresses a stacking method and apparatus that are particularly well suited to forming stacks of objects that have such inconsistency.

Figures 10A, 10B:
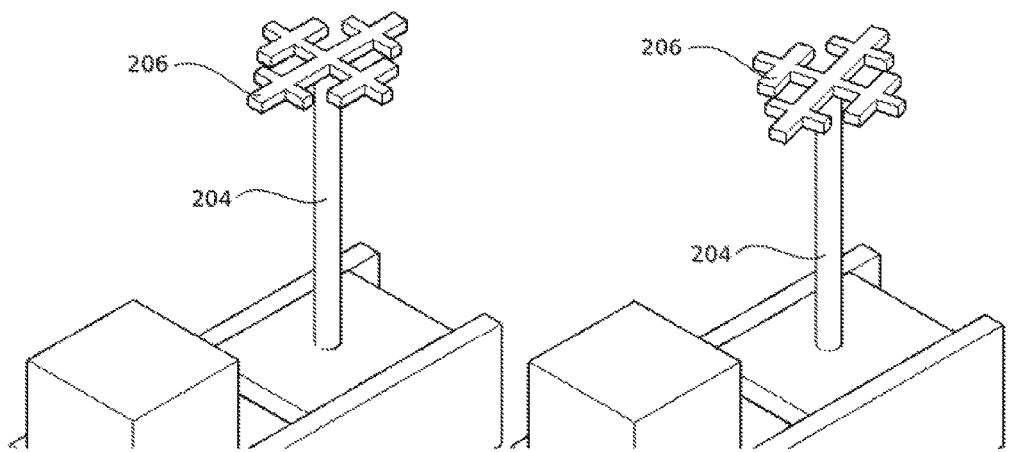
FIGS. 10A-H illustrate various positions of a support plate in use.
Figures 10C, 10D:
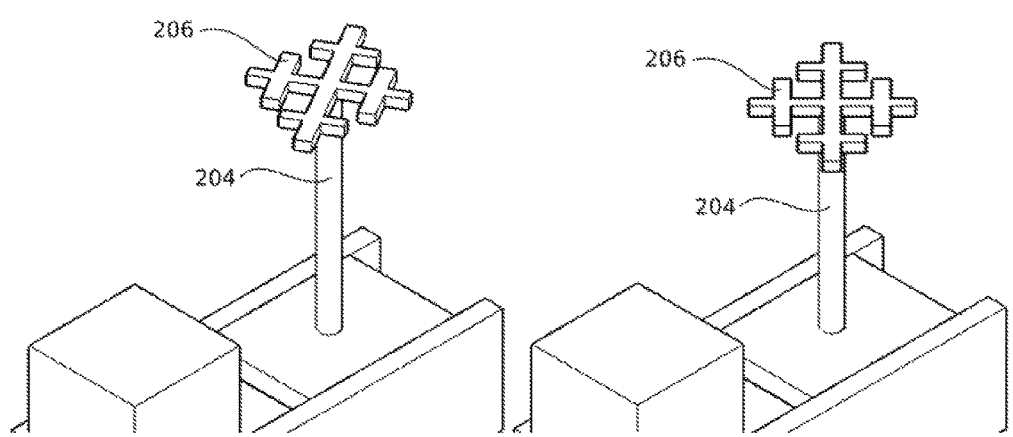
Figures 10E, 10F:
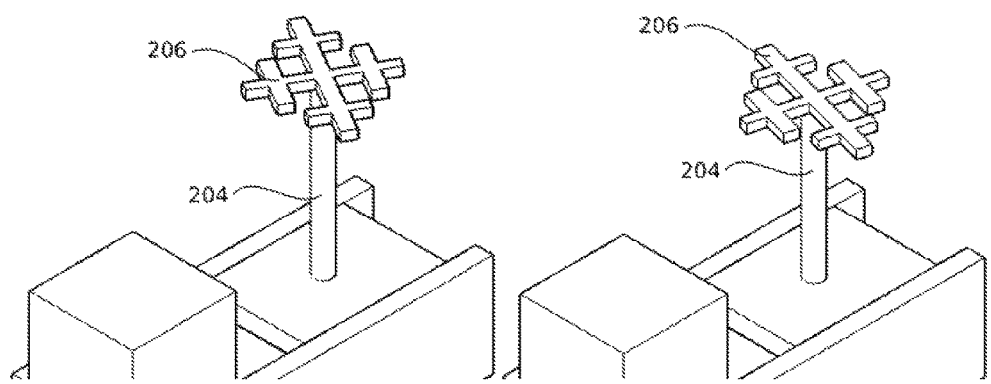
Figures 10G, 10H:
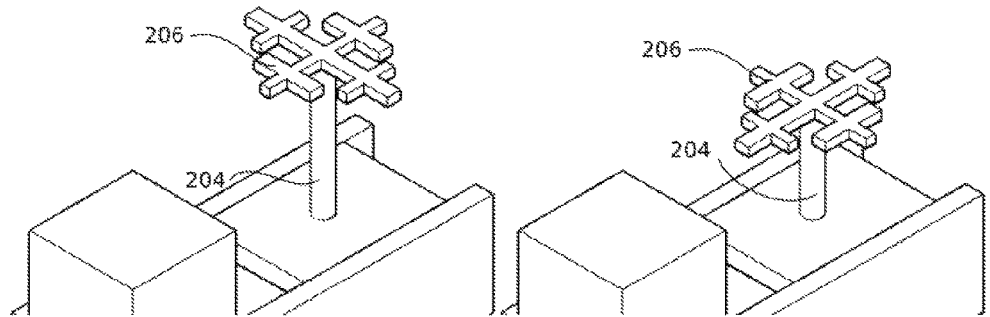

FIG. 10A through FIG. 10G illustrate a representative sequence of movements of stack support 200 during a stacking operation. For clarity of illustration, the pertinent portions of stack support 200 are shown in isolation, and without any of the objects being stacked. FIG. 10A shows support plate 206 in its initial, highest position, corresponding to that of FIG. 7. This shows the position of stack support 206 as it is ready to accept a first of the objects to be stacked.

FIG. 10B through FIG. 10G illustrate the incremental position of support plate 206 after an additional object is added to the stack of objects. In each sequential position, support plate 206 is lower, and its rotational orientation has been adjusted. This sequence can continue until a stack of the desired size is obtained. Once the desired stack has been created, stack support 200 moves to the position illustrated in FIG. 10H. In this position, the rotational orientation of support plate 206 is set so that it is properly aligned with partial rollers 111, and the height of support plate 206 relative to partial rollers 111 of output conveyor 300 is such that an upper surface of support plate 206 is lower than a top of each of partial rollers 111 in output conveyor 300, to effect a transfer of the stack of objects from support plate 206 to partial rollers 111 of output conveyor 300. This corresponds to the position illustrated in FIG. 8.

Figure 11:
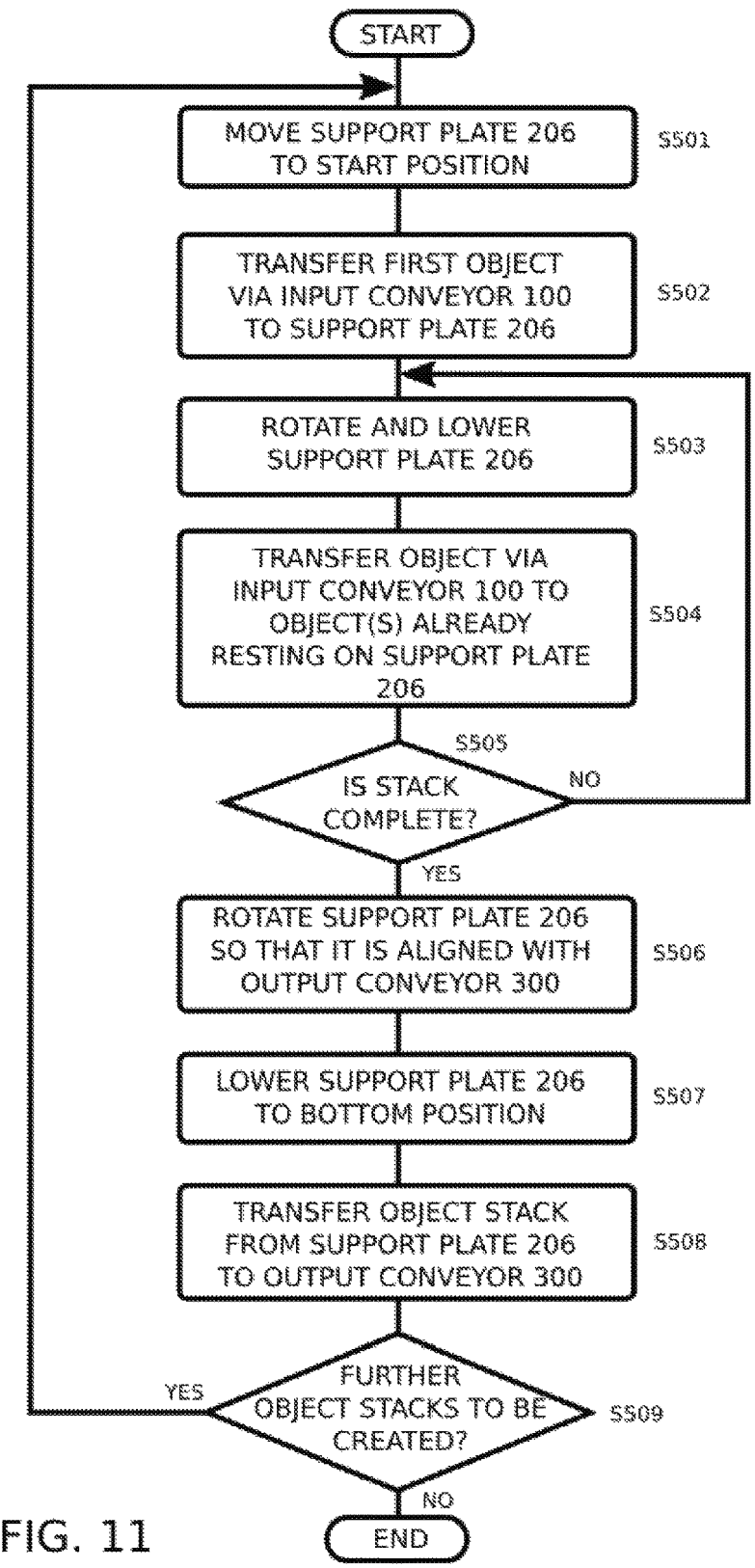
FIG. 11 is a flowchart describing operation of the apparatus.

Operation of the apparatus will be described in connection with the flowchart of FIG. 11. At the beginning of operation, in step S501, support plate 206 is moved to its start position. This corresponds to the position illustrated in FIG. 7. In step S502, a first of the objects to be stacked is moved by input conveyor 100 so that the object comes to rest on support plate 206. This is in process in FIG. 9A. In step S503, support plate 206 is rotated via support shaft motor 205 and lowered via platform motor 203. This rotation and lowering is illustrated in the sequence illustrated in FIGS. 10A-B.

In step S504, the next object is transferred via input conveyor 100 to be supported by support plate 206. As this is not the first object on the stack, instead of coming to rest directly upon support plate 206, it instead is in contact with the most recent object added to the stack. This corresponds to FIG. 9C.

The apparatus that determines whether the stack is complete. This determination can be made by any of a number of known methods, using known sensors. This can include one or more devices to detect the number of objects in the stack, the height of the stack, or the weight of the stack. If the stack is not complete, steps S503 and S504 are repeated.

If it is determined that the stack is complete, no further objects are added to the stack. In step S506, support plate 206 is rotated via support shaft motor 205 so that support plate 206 is rotationally aligned with output conveyor 300. When properly aligned, support plate 206 is lowered via platform motor 203 to its bottom position is step S507. This condition of the apparatus is illustrated in FIG. 8, although without the object stack. In such position, an upper surface of support plate 206 is below a highest point of a conveying surface of output conveyor 300, in this case partial rollers 111. In this position, the object stack is no longer supported by support plate 206, but is instead supported by output conveyor 300. In step S508, the object stack, now supported by output conveyor 300, is transported away from support plate 206 for further processing.

In step S509, the determination is made whether to create another stack of objects. If so, the entire process is repeated.

A great number of variations and options are available to adapt the disclosed method and apparatus to different conditions. The nature of the rotation can be modified to best suit the characteristics of the objects being stacked and manufacturing priorities.

In some embodiments, the rotation is incremental. The rotation occurs in a series of discrete steps during each stack formation. The timing of such rotation may be coordinated with the addition of each object to the stack so that as the object is dropping onto either support plate 206 or the objects already stacked on support plate 206, support plate 206 is not rotating. In other words, support plate 206 is rotated between successive additions of objects to the stack.

In other embodiments, rotation of support plate 206 is continuous during stack formation. Once rotation begins either before or after the first object comes to rest on support plate 206, support plate 206 rotates continuously until the stack is complete.

Stack rotation can be directed by a user-managed controller. This may provide options to the user as to whether rotation is continuous or incremental. Additionally, the controller may allow the user to choose a rate of continuous rotation, an extent of incremental rotation, as well as other characteristics of the rotation.

The vertical motion of the linearly movable portions of stack support 200 may also be subject to user control. This may include the rate of vertical displacement, the extent of vertical displacement for each object added to the stack, whether such vertical displacement is fixed or based on the current height of the stack of objects or a position of a top of the stack of objects relative to input conveyor 100, and other features.

While exemplary embodiments have been described, it is understood that other variations and embodiments are possible within the spirit and scope of the invention, the scope of which is defined by the appended claims.

The invention claimed is:

1. A rotating flatbread stacker comprising:
   a stack support;
   an input conveyor arranged so that flatbreads transported by the input conveyor can be moved toward and be supported by the stack support, thereby forming a flatbread stack;
   an output conveyor arranged lower than the input conveyor so that the flatbread stack can be moved off of the stack support;
   a slide plate extending from a terminal end of the input conveyor, the slide plate comprising a semi-circle cutout aligned with a drop channel configured to receive flatbreads therein; and
   a semi-circle backstop extending above a horizontal surface of the slide plate in front of the terminal end of the input conveyor,
   wherein the stack support comprises a stack support plate disposed on a top end of a rod, the rod being controlled to perform vertical motion between upper and lower positions, the upper position placing the stack support plate relatively nearer the input conveyor, the lower position placing the stack support plate relatively nearer the output conveyor,
   wherein the rod is also controlled to perform rotational motion so as to rotate the stack support plate and any of the flatbreads in the flatbread stack resting on the stack support plate, and
   wherein the rotating flatbread stacker is constructed and arranged so as to repeatedly raise the rod to the upper position to create a new said flatbread stack, and for each said flatbread that is added to the stack by the input conveyor, performing the vertical motion to lower the stack so as to keep a top of the flatbread stack in generally a constant position with respect to the input conveyor, and performing the rotational motion, until the flatbread stack is complete, whereupon the rod is moved to the lower position and the output conveyor moves the flatbread stack away from the stack support plate.

2. The rotating flatbread stacker of claim 1, wherein the stack support plate is constructed and arranged so as not to rotate while each said flatbread is being added to the flatbread stack.

3. The rotating flatbread stacker of claim 2, wherein the stack support plate is constructed and arranged so as to rotate through a fixed predetermined rotation angle during a time between successive said flatbreads being added to the flatbread stack.

4. The rotating flatbread stacker of claim 3, wherein the stacker is constructed and arranged so as to be adjustable by a user to set the rotation angle to a desired value.

5. The rotating flatbread stacker of claim 1, wherein the stack support plate is constructed and arranged so as to rotate continuously while the flatbread stack is being formed.

6. The rotating flatbread stacker of claim 5, wherein the stacker is constructed and arranged so as to be adjustable by a user to set a rate at which the stack support continuously rotates while the object stack is being formed.

7. The rotating flatbread stacker of claim 1, wherein the stack support plate is configured to be positioned within the flatbread-receiving portion at the upper position.

8. The rotating flatbread stacker of claim 1, wherein, in the lower position, the stack support plate is configured to be recessed within the output conveyor.

9. The rotating flatbread stacker of claim 1, wherein the output conveyor comprises a plurality of rollers, and an upper surface of the stack support plate in the lower position is lower than a top of the plurality of rollers of the output conveyor to effect a transfer of the flatbread stack from the stack support plate to the rollers of the output conveyor.

10. A rotating flatbread stacker comprising:

a stack support;

an input conveyor arranged so that flatbreads transported by the input conveyor can be moved toward and be supported by the stack support, thereby forming a flatbread stack;

an output conveyor arranged lower than the input conveyor so that the flatbread stack can be moved off of the stack support;

a slide plate extending from a terminal end of the input conveyor, the slide plate comprising a semi-circle cutout aligned with a drop channel configured to receive flatbreads therein; and a semi-circle backstop extending above a horizontal surface of the slide plate in front of the terminal end of the input conveyor, wherein the stack support comprises a stack support plate disposed on a top end of a rod, the rod being controlled to perform vertical motion between upper and lower positions, the upper position placing the stack support plate at the level of the input conveyor to directly receive the flatbreads from the input conveyor, the lower position placing the stack support plate relatively nearer the output conveyor, wherein the rod is also controlled to perform rotational motion so as to rotate the stack support plate and any of the flatbreads in the flatbread stack resting on the stack support plate, and wherein the rotating flatbread stacker is constructed and arranged so as to repeatedly raise the rod to the upper position to create a new said flatbread stack, and for each said flatbread that is added to the stack by the input conveyor, performing the vertical motion to lower the stack so as to keep a top of the flatbread stack in generally a constant position with respect to the input conveyor, and performing the rotational motion, until the flatbread stack is complete, whereupon the rod is moved to the lower position and the output conveyor moves the flatbread stack away from the stack support plate.

11. The rotating flatbread stacker of claim 10, wherein the stack support plate is configured to receive the flatbreads in a direction of movement of the input conveyor.

12. The rotating flatbread stacker of claim 10, wherein the flatbreads are transported directly from the input conveyor to the stack support plate such that the top of the flatbread stack is maintained in the generally constant position with respect to the input conveyor.

* * * * *